United States Patent [19]
Klingstrom et al.

[11] 3,819,490
[45] June 25, 1974

[54] TESTING DEVICE FOR USE WHEN MAKING BACTERIOLOGICAL TESTS

[76] Inventors: Emil Allan Klingstrom, Radjursstigen 42, S-171 72 Solna; Sten Martin Johansson, Allevagen 53, S-191 77 Sollentuna, both of Sweden

[22] Filed: Dec. 8, 1971

[21] Appl. No.: 205,785

[52] U.S. Cl. .......................... 195/127, 195/103.5 R
[51] Int. Cl. ............................................. C12k 1/10
[58] Field of Search............. 195/103.5 R, 127, 139

[56] References Cited
UNITED STATES PATENTS

| | | | |
|---|---|---|---|
| 2,787,591 | 4/1957 | Scherr | 195/103.5 R |
| 3,010,880 | 11/1961 | Littman et al. | 195/103.5 R |
| 3,245,882 | 4/1966 | Guthrie | 195/103.5 R |
| 3,341,427 | 9/1967 | Evans et al. | 195/103.5 R |

*Primary Examiner*—Alvin E. Tanenholtz
*Assistant Examiner*—Robert J. Warden
*Attorney, Agent, or Firm*—Salter & Michaelson

[57] ABSTRACT

The invention concerns a preferably star-shaped testing device for bacteriological tests. Circular discs of filter paper impregnated with different antibiotics are interconnected by arms of the same material. At least adjacent the discs, said arms are impregnated so as to break the capillary action of the filter paper and prevent migration of the antibiotic into the arm. The arms are also provided with scales permitting simple determination of the clear zones around the discs when the testing device is put on a culture plate.

3 Claims, 1 Drawing Figure

PATENTED JUN 25 1974 3,819,490
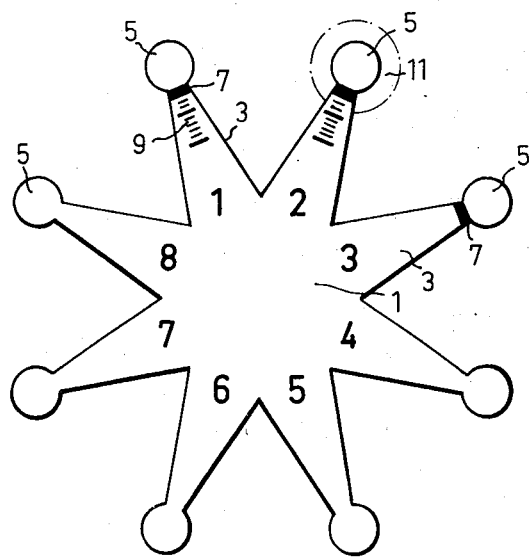
INVENTORS
EMIL ALLAN KLINGSTROM and
STEN MARTIN JOHANSSON
BY
SALTER & MICHAELSON
Attorneys

TESTING DEVICE FOR USE WHEN MAKING BACTERIOLOGICAL TESTS

The present invention relates to a testing device for use when making bacteriological and similar tests, and more specifically to such a device which comprises a plurality of discs made from a porous material such as filter paper, and held together by means of connecting arms made from the same material as the discs.

When investigating the resistance of bacteria to antibiotics in order to ascertain which antibiotic can be favorably used against the bacteria, present day processes involve the procedure of applying the bacteria sample onto a culture plate and placing small pieces of filter paper on the sample, each piece of filter paper having been impregnated with carefully determined quantities of different antibiotics, whereupon a bacteria culture grows on the culture plate to cover the surface thereof with the exception of zones around the pieces of filter paper impregnated with antibiotics active against the bacteria in question. The size of these zones gives an estimation of the efficiency of the antibiotic used. Although the results afforded by this procedure are good, the procedure is both complicated and time consuming since a number of separate pieces of paper must be first impregnated and then placed on the culture plate.

In order to save time, it has been proposed that a star shaped piece of filter material is used whose points are impregnated with different antibiotics. When applying this procedure, the star is placed in its entirety in the bacteria sample on the culture plate, an indication of a suitable antibiotic being obtained in the form of a clear zone around the point of the star impregnated therewith. This star shaped testing device, however, does not work satisfactorily, mainly because of the fact that the size of the clear zones can vary from case to case with the same bacteria and the same antibiotic. Such star shaped testing devices have therefore only found use in school laboratories and do not satisfy present day medical requirements.

The object of the present invention is therefore to provide a testing device, e.g., having the form of a star, which can be used for carrying out exact bacteriological tests within the field of medical care and attention. The concept of the present invention is based on the understanding that the reaction variations of known test stars are caused by the fact that the extent to which the different points of the star have been impregnated has varied from case to case.

The object of the present invention is achieved by means of a testing device of the type described in the introduction, the said testing device being characterized by the fact that the discs have an accurately determined configuration and surface, and that the connecting arms, at least within an area adjacent the discs, are impregnated with a substance which breaks the capillary properties of the porous material, thereby preventing the antibiotic from spreading into the arm.

The substance used to break the capillary properties of the porous material may be wax, paraffin, resin, plastics and the like and shall prevent the applied antibiotic from seeping into the connecting arm through the capillary system of the porous material.

In this way it can be ensured that only the intended quantity of antibiotic will be drawn up into the disc. Consequently, a large number of testing devices can be effectively and efficiently impregnated at the same time, e.g. by dipping the devices in sequence into different antibiotics.

Owing to the fact that the antibiotic is prevented from spreading into the arms connecting the discs during the cultivation period, the bacteria culture will leave a clear zone concentrically around the disc when this is circular, the zone having the form of a regular circle which greatly facilitates determination of the size of the zone. Determination of the size of the zone is an important factor, since it also gives an indication of which dosage should be administered when treating a patient.

To enable the size of the zones in the bacteria culture to be determined more easily, the connecting arms of the testing device according to the invention are provided with graduations or a distance scale starting at the periphery of the discs inwardly. In this way it is possible to read from the scale the radius of the clear zone and consequently its size, thereby eliminating subjective estimation of the zone and the necessity of using separate measuring instruments, and rendering determination of the size of the zones both accurate and simple.

Although the testing device of the present invention is preferably in the form of a star, other configurations are also conceivable within the purview of the invention. For example, the device may be in the form of a strip or a network with the discs connected to one or more arms.

Testing devices produced in accordance with the invention may be impregnated with various combinations of antibiotics for different types of tests such as bacteriological, urine, gram positive, gram negative and Pyo-R, for example. All known antibiotics are thus not used at each test, but only a certain combination, the composition of which depends, for example, on the type of infection from which a patient is suffering. The different antibiotic combinations are found available on different testing devices and the testing device carrying the combination of antibiotics corresponding to the type of infection in question is selected with each test. By means of such preprepared testing devices, the tests can be carried out rapidly, simply and accurately.

An embodiment of the invention will now be described in detail with reference to the accompanying drawing, which illustrates a testing device according to the invention in the form of an eight-point star.

In the drawing is shown a testing star 1 which is made of filter paper and provided with eight arms 3, each of which has arranged on its pointed end a circular disc 5. A portion 7 of the arms 3, where the arms join the discs 5, is impregnated with a substance, e.g., paraffin, which breaks the capillary properties of the filter material at this point. Alternatively, the whole of the arm 3 may be impregnated with such a substance.

As will be seen from the drawing, the arm 3 is provided with a graduated scale 9 extending from the disc 5.

When the testing device of the present invention is to be used, the discs 5 are impregnated with different antibiotics, although as previously mentioned the testing devices may be pre-impregnated and a store prepared from which appropriate devices can be taken for the tests to be carried out. The thus prepared testing device is placed on a culture plate containing a bacteria sample, whereupon subsequent to cultivation of the bacteria culture clear zones are left around discs 5, of which zones one is identified at the bottom of the drawing by the reference numeral 11. As will be seen from the drawing, the zone 11 is circular in shape and is concentrical with the discs. The size of the zone can be read directly from the scale 9 and in the illustrated embodiment has a relative size 4.

Although the invention has been described with reference to one embodiment thereof, it will be understood that it is not restricted thereto but can be modified within the concept of the invention. For example, in the illustrated embodiment all points of the star were described as being impregnated with a certain antibioticum to form an antibiotic combination. It may be desirable, however, to leave one point of the star shaped testing device free from antibiotic, thereby creating a neutral reference area for comparison purposes.

What we claim is:

1. A unitary testing device of bibulous sheet material, comprising a plurality of arm members, each having a substantially circular disc portion at its outer end, said disc portion being coplanar with the plane of said arm members and extending outwardly therefrom, said disc portions being impregnated with an antibiotic, and said arm members, in the area immediately adjacent said circular disc portions, at the juncture of said disc portion and said arm, being impregnated with a material which destroys the capillary properties of the bibulous material, to provide each of said disc portions with an accurately determined configuration and surface area, thus preventing the antibiotic from seeping into the arm during antibiotic impregnation of the disc and further wherein said arm members have graduations thereon adjacent said disc portions.

2. The testing device of claim 1 further characterized in that said arm members extend radially outward from a central connecting portion.

3. The testing device of claim 1 further characterized in that each of said disc portions is impregnated with a different antibiotic, the various antibiotics forming a combination selected from a plurality of predetermined antibiotics combinations, each of which is effective against a certain group of bacteria and type of infection.

* * * * *